United States Patent
Liu et al.

(10) Patent No.: US 11,259,303 B2
(45) Date of Patent: Feb. 22, 2022

(54) METHOD FOR MANAGING A HIGH FREQUENCY CONNECTION A TERMINAL AND A BASE STATION

(71) Applicant: HUAWEI TECHNOLOGIES CO., LTD., Shenzhen (CN)

(72) Inventors: Yalin Liu, Shenzhen (CN); Qinghai Zeng, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/434,310

(22) Filed: Jun. 7, 2019

(65) Prior Publication Data
US 2019/0289608 A1 Sep. 19, 2019

Related U.S. Application Data

(63) Continuation of application No. PCT/CN2016/108899, filed on Dec. 7, 2016.

(51) Int. Cl.
*H04W 72/04* (2009.01)
*H04W 76/18* (2018.01)
*H04W 52/02* (2009.01)
*H04W 36/24* (2009.01)
*H04W 16/32* (2009.01)
*H04W 36/36* (2009.01)
(Continued)

(52) U.S. Cl.
CPC ....... *H04W 72/0453* (2013.01); *H04W 36/24* (2013.01); *H04W 52/0216* (2013.01); *H04W 72/0413* (2013.01); *H04W 76/18* (2018.02);

*H04W 8/22* (2013.01); *H04W 16/32* (2013.01); *H04W 36/36* (2013.01); *H04W 88/06* (2013.01)

(58) Field of Classification Search
CPC . H04W 72/0453; H04W 76/18; H04W 36/24; H04W 52/0216; H04W 72/0413
See application file for complete search history.

(56) References Cited

U.S. PATENT DOCUMENTS

2005/0271009 A1* 12/2005 Shirakabe ............. H04W 16/10
370/329
2008/0039090 A1* 2/2008 Jin ........................ H04W 36/26
455/436
(Continued)

FOREIGN PATENT DOCUMENTS

CN 102014397 A 4/2011
CN 102413554 A 4/2012
(Continued)

*Primary Examiner* — Jael M Ulysse
(74) *Attorney, Agent, or Firm* — Hauptman Ham, LLP

(57) ABSTRACT

Embodiments of the present invention provides a method for managing a high frequency connection in a high frequency network. The method comprises receiving, by a terminal, a connection request message from a low frequency base station, the connection message includes a request for connecting the terminal with a high frequency base station; generating, by the terminal, a response message based on the request and at least one parameter of the terminal; transmitting, by the terminal, the generated response message to the LF base station, wherein the response message is used to determine whether to establish a connection with the HF base station.

20 Claims, 7 Drawing Sheets

(51) Int. Cl.
  *H04W 88/06* (2009.01)
  *H04W 8/22* (2009.01)

(56) References Cited

U.S. PATENT DOCUMENTS

| | | | | |
|---|---|---|---|---|
| 2008/0274738 | A1* | 11/2008 | Li | H04L 45/26 |
| | | | | 455/435.1 |
| 2009/0029710 | A1* | 1/2009 | Ochiai | H04W 72/08 |
| | | | | 455/450 |
| 2009/0186615 | A1* | 7/2009 | Kwon | H04W 36/04 |
| | | | | 455/436 |
| 2009/0215460 | A1* | 8/2009 | Hasegawa | H04W 36/0061 |
| | | | | 455/437 |
| 2009/0270079 | A1* | 10/2009 | Han | H04W 36/0061 |
| | | | | 455/414.1 |
| 2010/0003985 | A1* | 1/2010 | Jang | H04W 36/08 |
| | | | | 455/436 |
| 2011/0299446 | A1* | 12/2011 | Chun | H04W 72/04 |
| | | | | 370/311 |
| 2012/0190401 | A1* | 7/2012 | Makabe | H04W 36/00835 |
| | | | | 455/525 |
| 2013/0183970 | A1* | 7/2013 | Chen | H04W 36/30 |
| | | | | 455/436 |
| 2013/0195078 | A1* | 8/2013 | Kobayashi | H04W 36/165 |
| | | | | 370/331 |
| 2013/0231120 | A1 | 9/2013 | Koc et al. | |
| 2014/0023032 | A1* | 1/2014 | Kim | H04W 72/085 |
| | | | | 370/329 |
| 2014/0029570 | A1 | 1/2014 | Lee et al. | |
| 2014/0031040 | A1* | 1/2014 | Lee | H04W 36/005 |
| | | | | 455/437 |
| 2014/0092866 | A1* | 4/2014 | Teyeb | H04W 36/24 |
| | | | | 370/331 |
| 2014/0153423 | A1* | 6/2014 | Shin | H04W 36/18 |
| | | | | 370/252 |
| 2014/0192777 | A1* | 7/2014 | Seok | H04W 52/0229 |
| | | | | 370/331 |
| 2014/0226615 | A1* | 8/2014 | Beale | H04W 4/70 |
| | | | | 370/329 |
| 2014/0334446 | A1* | 11/2014 | Lim | H04W 28/08 |
| | | | | 370/331 |
| 2015/0043538 | A1* | 2/2015 | Xu | H04W 76/15 |
| | | | | 370/332 |
| 2015/0045048 | A1* | 2/2015 | Xu | H04W 72/0413 |
| | | | | 455/452.1 |
| 2015/0181491 | A1* | 6/2015 | Van Phan | H04W 36/26 |
| | | | | 370/331 |
| 2015/0181493 | A1* | 6/2015 | Park | H04W 36/0079 |
| | | | | 455/436 |
| 2015/0195762 | A1* | 7/2015 | Watanabe | H04W 36/0079 |
| | | | | 455/436 |
| 2015/0271763 | A1* | 9/2015 | Balachandran | H04L 43/0811 |
| | | | | 370/338 |
| 2015/0282032 | A1* | 10/2015 | Gupta | H04W 72/0453 |
| | | | | 370/237 |
| 2015/0373559 | A1* | 12/2015 | Hong | H04W 52/0206 |
| | | | | 370/329 |
| 2016/0028585 | A1* | 1/2016 | Wager | H04W 76/15 |
| | | | | 455/452.2 |
| 2016/0044555 | A1* | 2/2016 | Liang | H04W 36/36 |
| | | | | 370/331 |
| 2016/0087770 | A1 | 3/2016 | Chang et al. | |
| 2016/0095065 | A1* | 3/2016 | Richards | H04W 52/0235 |
| | | | | 370/311 |
| 2016/0157154 | A1* | 6/2016 | Nagasaka | H04W 36/00837 |
| | | | | 370/331 |
| 2016/0165605 | A1* | 6/2016 | Dimou | H04W 36/0072 |
| | | | | 370/329 |
| 2016/0183135 | A1 | 6/2016 | Kang et al. | |
| 2016/0183147 | A1* | 6/2016 | Da Silva | H04W 36/22 |
| | | | | 370/331 |
| 2016/0219475 | A1* | 7/2016 | Kim | H04W 28/08 |
| 2016/0242098 | A1* | 8/2016 | Tsukamoto | H04L 47/38 |
| 2016/0242226 | A1 | 8/2016 | Fushiki et al. | |
| 2016/0269952 | A1* | 9/2016 | Moon | H04W 36/08 |
| 2016/0295515 | A1* | 10/2016 | Cai | H04W 52/0261 |
| 2019/0089682 | A1 | 3/2019 | Ryoo et al. | |

FOREIGN PATENT DOCUMENTS

| | | |
|---|---|---|
| CN | 102655682 A | 9/2012 |
| CN | 104010330 A | 8/2014 |
| CN | 104782172 A | 7/2015 |
| CN | 105557006 A | 5/2016 |
| CN | 105745957 A | 7/2016 |
| EP | 2603038 A1 | 6/2013 |
| EP | 2934056 A1 | 10/2015 |
| EP | 2983393 A1 | 2/2016 |
| EP | 3062550 A1 | 8/2016 |

* cited by examiner

Please shut off the high frequency switch!

Would like to shut off the high frequency switch?
YES   NO
FIG. 5B
Notifications          Shortcuts
   
Huawei-     4G           Sound        Settings
Employee
   
Bluetooth   Do not disturb   Aeroplane    GPS
                             mode
   
WLAN hotspot   Mobile data   Auto Rotate   One-hand UI
   
Screenshot   Torch        Suspend button   Multi-screen
   
Lock screen   Ultra battery   Auto-sync   High Frequency
   
FIG. 6

Physical HF switch

METHOD FOR MANAGING A HIGH FREQUENCY CONNECTION A TERMINAL AND A BASE STATION

CROSS-REFERENCE TO RELATED APPLICATIONS

This application is a continuation of International Application No. PCT/CN2016/108899, filed on Dec. 7, 2016, the disclosure of which is hereby incorporated by reference in its entirety.

TECHNICAL FIELD

The present invention relates to the communications technologies, and in particular, to a method for managing a high frequency connection, a terminal and a base station.

BACKGROUND

With the development of wireless technologies, broadband wireless technologies develop rapidly. Especially, the development of Long Term Evolution (LTE) promotes the development of intelligent terminals in an all-round manner, and the intelligent terminals are not limited to smartphones and also include increasing machine intelligent terminals. The machine type intelligent terminals are complex and diversified, which imposes different requirements for a network. As a result, an existing LTE network cannot meet massive machine type communication (mMTC) services in the foreseeable future. In addition, future services, for example, virtual reality, have higher requirement for bandwidth and delay, and bandwidth of an existing wireless network cannot meet requirements for this type of applications. Therefore, to adapt to future services, the 3rd Generation Partnership Project (3GPP) is formulating requirements for 5G technologies and related technical standards, so as to meet requirements for massive machine communication and high-bandwidth services in the futures.

To support high bandwidth, available bandwidth on low frequency band is almost exhausted currently. Therefore, to meet the requirements for higher bandwidth in the future, a higher frequency band needs to be used, for example, 6-100 GHz spectrums. Currently, high frequency (HF) bands that are being considered by the 3GPP are 30-40 GHz and 70-80 GHz frequency bands. According to the latest progress of standard, the determined 5G HF supports two deployment scenarios, i.e. low frequency (LF) assisted HF mode (also named non-standalone mode) and independent HF mode (also named standalone mode).

HF transmission has very low diffraction which leads to high path loss, and may be easily affected by an environment such as blockage, thereby may easily causing link outage. Therefore, a gain antenna is generally used for HF transmission. The gain antenna generally forms many beams, and each beam covers a narrow area. For cost considerations, an analog array antenna or a hybrid (analog and digital) array antenna is generally used. On the base station side, different beams are formed by using an antenna array. Because a quantity of simultaneous beams require amount of analog antenna which will lead to high cost, multiple simultaneous beams, i.e. hybrid beam will be generally used. Due to this limitation, beam sweeping method needs to be used in order to provide comparable coverage as legacy.

During HF transmission by using a beam, the terminal and base station can communicate with each other only when beam alignment is kept between them. Beam alignment is implemented by means of beam sweeping. Therefore, the terminal needs to scan all possible beams of the base station, so as to determine a best or multiple useful paired beams and use them for transmission.

It can be learned that the beam sweeping method makes an HF system more complex relative to a low frequency (LF) system. Compared with LF system, an HF system will cause higher power consumption.

SUMMARY

The present invention provides a telecommunication method and a terminal, to resolve the technical problem that the HF system causes higher power consumption.

According to a first aspect, an embodiment of the present application provides a method for managing a high frequency connection in a high frequency network, the method comprises:

receiving, by a terminal, a connection request message from a low frequency base station, the connection message includes a request for connecting the terminal with a high frequency base station;

generating, by the terminal, a response message based on the request and at least one parameter of the terminal;

transmitting, by the terminal, the generated response message to the LF base station, wherein the response message is used to determine whether to establish a connection with the HF base station.

In a first possible implementation manner, the high frequency connection message is an RRC message.

In a second possible implementation manner, the high frequency connection message is an MAC CE.

In a third possible implementation manner, wherein when the response message indicates a rejection of connecting with the high frequency base station, the response message includes a cause of rejection.

In a fourth possible implementation manner, wherein the at least one parameter of the terminal is: battery level, capability of buffer, channel status.

In a fifth possible implementation manner, wherein the connection request message includes at least one of the following: maximum bandwidth scheduled for the terminal, or a scheduled data volume, or pre-estimated scheduling duration, identifier of high frequency base station.

The advantage is to inform the terminal other parameter about the high frequency connection, to enable terminal determine whether the resource of itself could support a high frequency connection.

In a sixth possible implementation manner, wherein the response message includes at least one of the following: maximum transmit power, or available bandwidth, or estimated scheduling duration, or a battery level.

The advantage is to inform the low frequency base station the resource of the terminal to enable the low frequency base station could determine whether or not to initiate a high frequency connection.

According to a second aspect, an embodiment of the present application provides a terminal, comprises a transmitter, a receiver and a processor coupled to the transmitter and the receiver, wherein the receiver, configured to receive a connection request message from a low frequency base station, the connection request message includes a request for connecting the terminal with a high frequency base station;

the processor, configured to configured to generate a response message based on the request and at least one parameter of the terminal;

the transmitter, configured to transmit the generated response message to the LF base station, wherein the response message is used to determine whether to establish a connection with the HF base station.

In a first possible implementation manner, the termination request message is a RRC message or a MAC CE.

In a second possible implementation manner, wherein when the response message indicates a rejection of connecting with the HF base station, the response message includes a cause of rejection.

In a third possible implementation manner, wherein the at least one parameter of the terminal is: battery level, capability of buffer, channel status.

In a fourth possible implementation manner, wherein the connection request message includes at least one of the following: maximum bandwidth scheduled for the terminal, or a scheduled data volume, or pre-estimated scheduling duration, identifier of high frequency base station.

In a fifth possible implementation manner, wherein the response message includes at least one of following: maximum transmit power, available bandwidth, estimated scheduling duration, a battery level.

According to a third aspect, an embodiment of the present application provides a method for managing a high frequency connection, comprising: receiving, by a low frequency, LF, base station, a termination request message includes an identifier of a terminal, the termination request message including a request for terminating a high frequency connection between the terminal and a high frequency, HF, base station;

generating, by the LF base station, a response message based on the received termination request message and a parameter of the high frequency connection;

sending, by the LF base station, the response message to the HF base station.

In a first possible implementation manner, wherein the parameter of the HF connection includes at least one of following: the amount of data transmitted, the amount of data to be transmitted.

In a second possible implementation manner, wherein the termination request message further comprises: battery level, capability of buffer, channel status.

In a third possible implementation manner, wherein when the response message indicating to disconnect the high frequency connection, the response message comprises a cause of disconnection.

The cause of disconnection could be: a battery level is lower than a preset value, or the capability of cache is lower than a preset value, or the status of channel is bad.

In a fourth possible implementation manner, the termination request message is a RRC message or a MAC CE.

According to a fourth aspect, an embodiment of present application provides a low frequency base station, comprising: receiver, configured to receive a termination request message includes an identifier of a terminal, the termination request message including a request for terminating a high frequency connection between the terminal and a high frequency, HF, base station;

processor coupled to the receiver, configured to generate a response message based on the received termination request message and a parameter of the high frequency connection;

transmitter coupled to the processor, configured to send the response message to the HF base station.

In a first possible implementation manner, wherein the parameter of the HF connection includes at least one of following: the amount of data transmitted, the amount of data to be transmitted.

In a second possible implementation manner, wherein the termination request message further comprises: battery level, capability of buffer, channel status.

In a third possible implementation manner, wherein when the response message indicating to disconnect the high frequency connection, the response message comprises a cause of disconnection.

The cause of disconnection could be: a battery level is lower than a preset value, or the capability of cache is lower than a preset value, or the status of channel is bad.

In a fourth possible implementation manner, the termination request message is a RRC message or a MAC CE.

According to a fifth aspect, an embodiment of present application provides a terminal, comprises a processor, display and user interface, wherein:

the processor, configured to send a message to display module when detecting at least one of following condition is met: a battery level is lower than a preset value, or the capability of cache is lower than a preset value, or the status of channel is bad;

the display, configured to display information reminder a user of the terminal to disable a switch of high frequency function;

user interface, configured to include a switch of high frequency function, turning on the switch indicating the terminal could transmit data with a high frequency base station and when turn off the switch indicating the terminal could not transmit data with the high frequency base station.

In a first possible implementation manner, the switch of high frequency function is a physical button, set on any side of the terminal or on the panel of the terminal.

In a second possible implementation manner, the switch of high frequency function is turned on or off by pressing for a certain period of time by means of a fingerprint.

In a third possible implementation manner, the switch of high frequency is turned on or off by performing a gesture operation on the display.

In a fourth possible implementation manner, the switch of high frequency is set on GUI of the terminal, when turn off the switch, the color of the switch is turned to gray or some other color which is different from on mode.

According to a sixth aspect, an embodiment of present application provides a method for managing a high frequency connection in a high frequency network, comprising: receiving, by a high frequency base station, a high frequency connection stop request message from a terminal, the high frequency connection stop request message comprises an identifier of the terminal; sending, by the high frequency base station, a data transmission stop message to a low frequency base station to request to stop sending data to the high frequency; determining, by the high frequency base station, the buffer status of the terminal is empty; terminating, by the high frequency base station, the high frequency data transmission with the terminal.

In a first implementation manner, wherein the method further comprises: receiving, by the high frequency base station, a response message corresponding the data transmission stop message from the low frequency base station.

In a second implementation manner, wherein the data transmission stop message comprises a cause for requesting stopping data transmission.

In a third implementation manner, the high frequency connection stop message comprises a cause for requesting terminating the high frequency connection.

In a fourth possible implementation manner, the high frequency connection stop request message is a RRC message or a MAC CE.

According to a seventh aspect, an embodiment of present application provides a high frequency base station, comprises a processor, a transmitter and a receiver, the transmitter and receiver are coupled to the processor, wherein:

the receiver, configured to receive a high frequency connection stop request message from a terminal, the high frequency connection stop request message comprises an identifier of the terminal;

the transmitter, configured to send a data transmission stop message to a low frequency base station to request to stop sending data to the high frequency the processor, configured to determine the buffer status of the terminal is empty, and terminate the high frequency data transmission with the terminal.

In a first implementation manner, wherein the receiver is configured to: receive a response message corresponding the data transmission stop message from the low frequency base station.

In a second implementation manner, wherein the data transmission stop message comprises a cause for requesting stopping data transmission.

In a third implementation manner, wherein the high frequency connection stop message comprises a cause for requesting terminating the high frequency connection.

According to a eighth aspect, an embodiment of present application provides a graphical user interface (GUI), the GUI is set on an electronic device, the electronic device comprises display, memory, and one or more processors adapted to execute one or more programs stored in the memory, wherein the display comprises touch sensitive surface and display screen, the GUI comprises:

an icon set on a menu, when click or press the icon, a high frequency connection between the electronic device and a high frequency base station is terminated or started.

In a first implementation manner, when touching the top of the touch sensitive surface and dragging finger of users, the menu will show.

In a second implementation manner, when clicking an application or program named setting, an item named wireless and network will show in a first menu, when clicking the item wireless and network, an item named more will show in a second menu, when click the item more, the icon will show in a third menu.

The advantage of the present application is considering many unexpected conditions may happen in high frequency transmission, it adopts the future 5G much better. For example, when considering the battery level, the embodiment 1 reduces power consumption. When considering the status of channel, the embodiment 1 could provide a better user experience. When considering the capability of cache, the embodiment 2 could stop the possible error.

BRIEF DESCRIPTION OF DRAWINGS

To describe the technical solutions in the embodiments of the present invention or in the prior art more clearly, the following briefly describes the accompanying drawings required for describing the embodiments or the prior art. Apparently, the accompanying drawings in the following description show some embodiments of the present invention, and persons of ordinary skill in the art may still derive other drawings from these accompanying drawings without creative efforts.

FIG. 5B is another possible implementation manner of reminding message according to the fourth embodiment;

FIG. 6 is a first implementation graph of fourth embodiment according to the present application;

DESCRIPTION OF EMBODIMENTS

In the following detailed description, reference is made to the accompanying drawings, which form a part of the disclosure, and in which are shown, by way of illustration, specific aspects in which the present application may be practiced. It is understood that other aspects may be utilized and structural or logical changes may be made without departing from the scope of the present application. The following detailed description, therefore, is not to be taken in a limiting sense, as the scope of the present invention is defined by the appended claims.

It is understood that a disclosure in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

Figure 1:
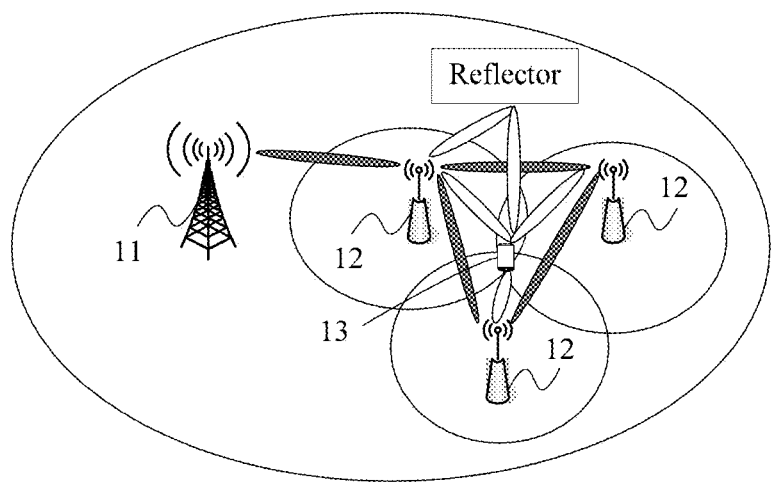
FIG. 1 is a schematic architectural diagram of a first application scenario of a processing method for reducing power consumption according to the present application.

FIG. 1 is a schematic architectural diagram of a first application scenario of a method for reducing power consumption according to the present application. In this scenario, an example in which a macro base station (also could be named low frequency base station) and a small cell (also could be named high frequency base station) are used as base stations is used for description. As shown in FIG. 1, in the low-frequency assisted high frequency networking architecture, a macro base station 11, a micro base station 12, and a terminal 13 are mainly included. The macro base station 11 generally uses a traditional cellular frequency band, for example, the cellular frequency band may be 2.4 GHz, or may use a millimeter wave frequency band with a relatively low frequency to achieve an objective of control-plane interaction with a relatively large area, where the millimeter wave frequency band with a relatively low frequency may be, for example, 6 GHz. The macro base station 11 may perform corresponding signaling interaction with the small cell 12 or the UE 13 by using the foregoing cellular frequency band or the millimeter wave frequency band. In addition, multiple small cells 12 may be arranged in coverage of the macro base station 11 to provide hotspot coverage. The small cell 12 uses a millimeter wave frequency band with a relatively high frequency (above 6 GHz), for example, the millimeter wave frequency band may be 28 GHz, 38 GHz, or an E-Band, to cover a data plane of a relatively small area. The small cell 12 may perform signaling interaction with the macro base station 11 by using the traditional cellular frequency band or the millimeter wave frequency band with a relatively low frequency or fiber, but cannot perform signaling interaction with the terminal 13 by using the foregoing cellular frequency band or the millimeter wave frequency band with a relatively low frequency. In addition, the terminal 13 in coverage of the small cell 12 may perform data plane interaction with the small cell 12 by using a millimeter wave frequency band with a relatively high frequency, and may perform control plane interaction with the macro base station 11 by using a cellular frequency band or a millimeter wave frequency band with a relatively low frequency.

Figure 2:
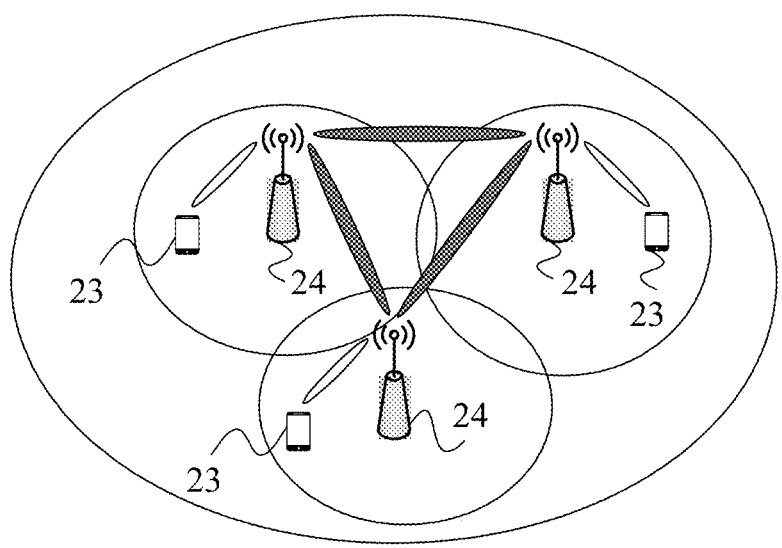
FIG. 2 is another schematic architectural diagram of a second application scenario of a processing method for reducing power consumption according to the present application.

FIG. 2 is a schematic architectural diagram of a second application scenario of a method for reducing power consumption according to the present application. As shown in FIG. 2, in the standalone networking architecture, a base station 24 and terminal 23 are mainly included. The base station may perform communication by using a millimeter wave frequency (above 6 GHz) with the terminal 23 with a relatively high frequency, where the millimeter wave frequency band with a relatively high frequency may be, for example, 28 GHz, 38 GHz, or an E-Band.

It may be learned that regardless of a case in which high-frequency communication between UE and a small cell is performed in a high-low frequency macro/micro networking architecture or of a case in which high-frequency communication between UE and a base station is performed in a high-low frequency distributed networking architecture, how to reducing power consumption is a very important problem.

It should be noted that both of the application scenarios shown in FIG. 1 and FIG. 2 are comply to wireless network frameworks of the 3rd Generation Partnership Project (3GPP), but the present application is also applicable to another scenario in which a cellular network with wide coverage while millimeter wave cellular coexisted for data transmission.

Embodiment 1 of the Present Application

A low-frequency assisted HF mode is a promising deployment mode in the future, and can make the best of advantages of a low frequency so that a terminal can easily perform initial access and idle or inactive mode mobility. However, an HF has advantages in improving data transmission rate. Therefore, in the low-frequency assisted HF mode, a network may negotiate HF transmission with a user by using a low-frequency network. Alternatively, in a standalone HF mode, when downlink data arrives, a network may first page a user in HF which will require a very complex operation of UE in order to receive paging message in some specific time slot. For the low frequency assisted high frequency, the basic operation process is as follows:

Before the base station schedules the user by using HF for data transmission, the low frequency base station sends an HF scheduling indication to the user, to query whether HF transmission can be performed. If a terminal of the user is in low battery, or due to other reasons such as an insufficient cache or a channel condition restriction, the terminal feeds back a HF scheduling rejection to the low frequency base station. When conditions of high frequency data transmission is satisfied, that is, the terminal is in good battery status or the capability of cache is enough or the channel state is good enough, the terminal sends a response to low frequency base station to indicate the HF scheduling can be performed to the base station. After that, the terminal and the high frequency base station perform beam sweeping (which is used to detect which beam can be used) and alignment (which is used to make sure the transmitting and receiving beam aligned in fine direction) process in order to transmit data via HF.

Figure 3:
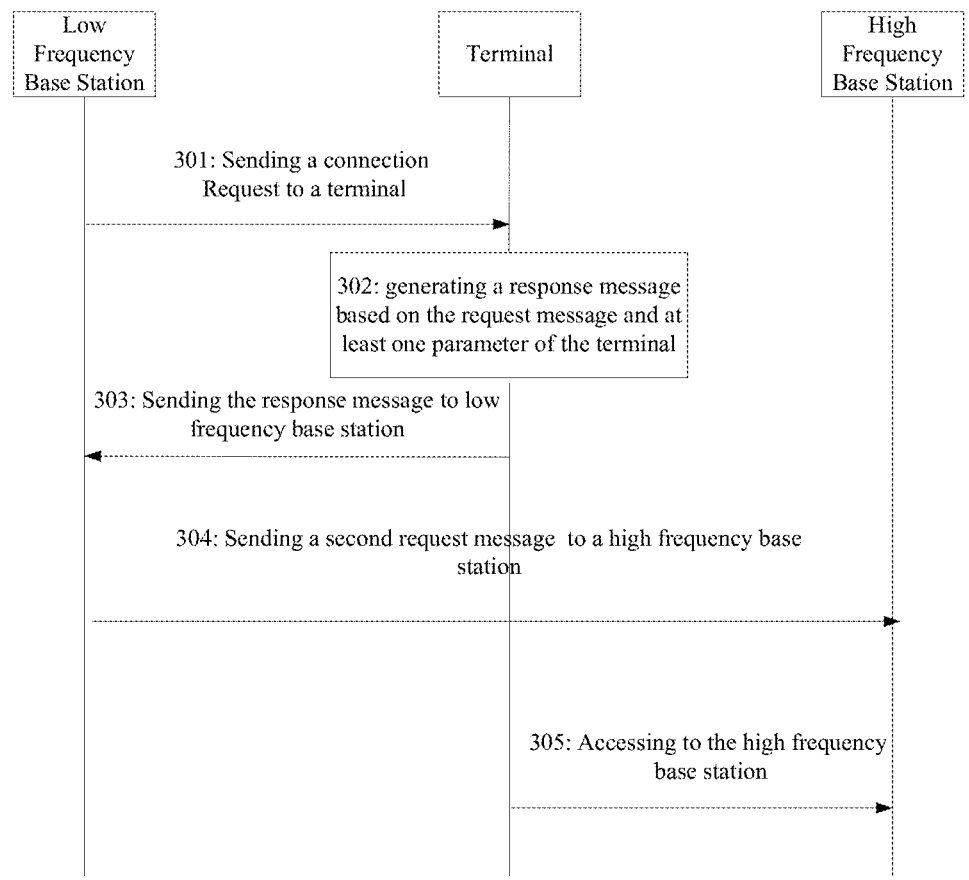
FIG. 3 is a schematic interactive chart of first embodiment according to the present application.

FIG. 3 is a schematic interactive chart of a method for managing a high frequency connection according to the first embodiment of the present application. A technical solution in this embodiment is when the battery level of the terminal is lower than a preset value, e.g. 15%, or the capability of cache is lower than a preset value or status of radio channel is bad, a high frequency transmission is rejected to the high frequency scheduling request. As shown in FIG. 3, the method 300 includes the following steps:

Step 301: The low frequency base station sends a connection request message to a terminal, the connection request message includes a request for connecting the terminal with a high frequency base station;

Step 302: when the terminal receives the connection request message from the low frequency base station, generates a response message based on the request message and at least one parameter of the terminal;

optionally, the at least one parameter of the terminal is: battery level, capability of buffer, channel status.

Step 303: sending the response message to LF base station, wherein the response message is used to determine whether to establish a connection with the HF base station.

For instance, if a battery level is lower than a preset value, or the capability of cache or buffer is lower than a threshold, or the status of radio channel is bad, the terminal may generating a response message indicating the high frequency connection is rejected. Otherwise, the terminal may generating a response message indicating the high frequency connection is allowable or ok.

Optionally, if the response message indicating the rejection of high frequency connection, the response message may includes a cause of rejection.

Optionally, the cause of the rejection may be: For example, the cause could be the battery is lower than the preset value, or the terminal is moving too fast, or the status of the channel is not good, or the capability of cache is lower than a preset value, or any other any possible reason.

Specifically, the cause of rejection may comprise a field, the field is at least one bit. For example, in this embodiment, the field is two bits, when the value of two bits is 00, it means the reason is battery is lower than a preset value; when the value of two bits is 01, it means the reason is terminal moves too fast; when the value of two bits is 10, it means the capability of cache is lower than a preset value; when the value of two bits is 11, it means the status of channel is too bad.

Step 304: if the response message indicating the high frequency connection is allowable, the low-frequency base station sends a second request message to high frequency base station, the second request message includes the context of the terminal, e.g. identifier of the terminal;

Step 305: the terminal accesses to the high-frequency base station.

Optionally, if the response message indicating the high frequency connection is allowable, the response message may also includes the following information:

Configuration information of data resource block (DRB) or security related parameters.

It should be noted that how the terminal accesses the high-frequency are not decided by standard yet and many technical solutions are provided presently, therefore, we will not elaborate the detail procedure of initial access to a high-frequency base station.

Optionally, the high frequency scheduling request message is a media access control control element (MAC CE).

Optionally, the high frequency scheduling request message is a radio resource control (RRC) message.

Further, the connection request message may further include at least one of the following information: maximum bandwidth or resource block quantity scheduling for the user, or a scheduled data volume, or pre-estimated scheduling duration.

The advantage is to inform the terminal other parameter about the high frequency connection, to enable terminal determine whether the resource of itself could support a high frequency connection.

Further, the response message may include at least one of the following: maximum transmit power, or maximum bandwidth could be scheduled, or estimated scheduling duration could be supported, or a battery level.

The advantage is to inform the low frequency base station the resource of the terminal to enable the low frequency base station could determine whether or not to initiate a high frequency connection. It should be noted that the embodiment 1 only applies to the non-standalone mode.

The advantages of the first embodiment is considering many unexpected conditions may happen in high frequency transmission, it adapts the future 5G much better. For example, when considering the battery level, the embodiment 1 reduces power consumption. When considering the status of radio channel, the embodiment 1 could provide a better user experience. When considering the capability of cache, the embodiment 1 could decrease the possible error.

Embodiment 2 of the Present Application

Figure 4:
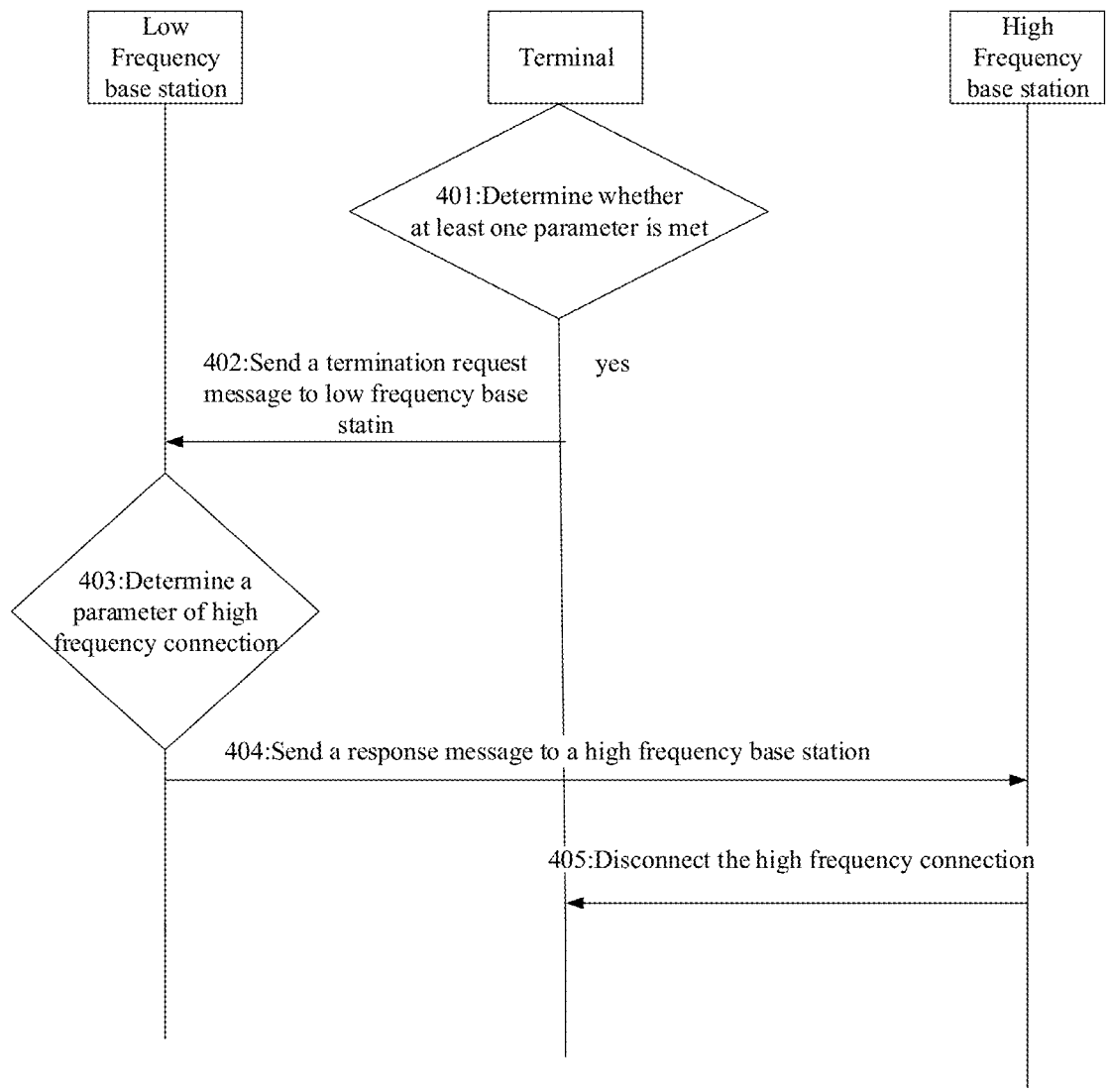
FIG. 4A is another schematic interactive chart of second embodiment according to the present application.
FIG. 4B is another schematic interactive chart of third embodiment according to the present application.

FIG. 4A is a flowchart of a method for reducing power consumption according to a second embodiment of the present application. In this embodiment, due to low battery level or bad radio channel state or low capability of cache, a terminal may request to stop the high frequency connection with a high frequency base station. As shown in FIG. 4A, the method 400 includes the following steps:

Step 401: determine whether at least one condition is met: the battery level is lower than a preset value; a capability of cache is lower than a preset value; state of channel is bad;

Step 402: the terminal sends a termination request message to low frequency base station if at least one parameter is met;

Optionally, the termination request message is a RRC message or a MAC CE.

Optionally, the termination request message may further comprises a cause for termination. The cause could be one and more of the followings: the battery level is lower than a preset value; a capability of cache is lower than a preset value; state of channel is bad.

Step 403: the low frequency base station determines a parameter of high frequency connection;

Optionally, the parameter of high frequency connection is the amount of data transmitted, the amount of data to be transmitted.

Step 404: the low frequency base station sends a response message to a high frequency base station;

Optionally, if the amount of data transmitted is equals to an amount data of user data, then the response message may indicating the high frequency base station to disconnect the terminal; if the amount of data transmitted is lower than an amount of user data, then the response message may indicating the high frequency base station to continue the connection with the terminal.

Optionally, the response message may also comprises the cause for termination.

Step 405: the high frequency base station disconnect or continue the high frequency connection according to the response message from the low frequency base station.

The advantage of the second embodiment is considering many unexpected conditions which may happen in high frequency transmission. It adapts the future 5G much better. For example, when considering the battery level, the embodiment 1 reduces power consumption. When considering the status of channel, the embodiment 1 could provide a better user experience. When considering the capability of cache, the embodiment 2 could stop the possible error.

Embodiment 3 of the Present Application

FIG. 4B is a flowchart of a method for reducing power consumption according to a third embodiment of the present application. In this embodiment, due to low battery level or bad radio channel state or low capability of cache, a terminal may request to stop the high frequency scheduling with a high frequency base station. As shown in FIG. 4B, the method 400 includes the following steps:

Step 401: determining whether at least one condition is met: the battery level is lower than a preset value; a capability of cache is lower than a preset value; state of channel is bad;

Step 402, the terminal sends a high frequency scheduling stop request message to a high frequency base station when at least one of the above conditions is met;

Optionally, the high frequency scheduling stop request message may comprise reason for stopping. The reason may be the battery level is lower than a preset value; a capability of cache is lower than a preset value; state of radio channel is bad. Specifically, the preset value could be set by a user or may be defaulted by a terminal system, for example, the preset value is set to 10%, 15% or 20% etc.

Specifically, the message may comprise a field, and the field is at least one bit. For example, in this embodiment, the field is two bits, when the value of two bits is 00, it means the reason is battery is lower than a preset value; when the value of two bits is 01, it means the reason is terminal moves too fast; when the value of two bits is 10, it means the capability of cache is lower than a preset value; when the value of two bits is 11, it means the status of channel is too bad.

Step 403: the high frequency base station sends a message to a low frequency base station to request to stop sending data to the high frequency;

Optionally, the message may comprise a reason for why stopping sending data. The reason might be the battery level is lower than a preset value; a capability of cache is lower than a preset value; state of channel is bad.

Optionally, the message may comprise the identifier of the terminal. The advantage of comprising an identifier of the terminal in the message is to tell the low frequency base station to stop sending user data associated with the terminal with the identifier.

Step 404: the low frequency base station send a response to the request of stopping data transmission on high frequency for the user. The data from core network will not send to high frequency base station any more for the requested user.

Optionally, User ID information may be included in this message.

Step 405: the high frequency base station receives the high frequency scheduling stop response message, there is no more data will be transmitted from low frequency base station. It determines whether the buffer status of the requested user is empty or not;

Step 406: the high frequency base station terminates the high frequency transmission if the buffer for the user is empty. The high frequency base station sends a stop response message to the terminal, the message is used to inform the terminal that the high frequency transmission will be terminated.

Step 407: if the buffer of the requested terminal in the high frequency base station is not empty, it's necessary for the high frequency base station to sustain the high frequency scheduling until the buffer is empty.

Optionally, after the buffer is empty, high frequency base station sends a notification to the terminal that the data transmission from high frequency base station is terminated and no more data transmitted from high frequency base station.

Optionally, the notification could be an independent RRC message or a MAC CE which is transmitted with the last remaining data to the terminal.

It should be noted that the embodiment 2 and 3 only apply to the non-standalone mode.

The advantage of the third embodiment is considering many unexpected conditions which may happen in high frequency transmission. It adapts the future 5G much better. For example, when considering the battery level, the embodiment 1 reduces power consumption. When considering the status of channel, the embodiment 1 could provide a better user experience. When considering the capability of cache, the embodiment 2 could stop the possible error.

Embodiment 4 of the Present Application

Figure 10:
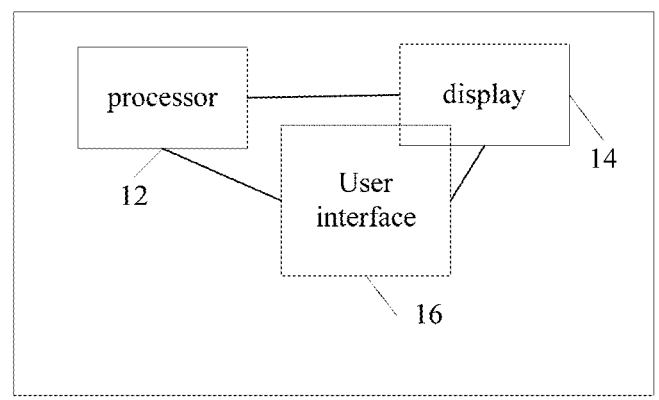
FIG. 10 is another schematic structure of a terminal according to another embodiment of the present application.

In a fourth embodiment of the present application, due to low battery level or lower capability of cache or bad state of channel, a terminal may remind the user of the terminal to disable the high frequency function. It provides a terminal comprising a processor 12, a display 14 and user interface 16 as shown in FIG. 10, and it further includes a memory (not shown in FIG. 10). The user interface 16 refers to interaction media between terminal and a user for information exchange. Usually, user interface may be hardware-based or software-based. The hardware may refer to keyboard, mouse, microphone. The software may refer to command interface, program interface and graphical user interface.

In present application, the user interface comprises hardware or graphical user interface. A graphical user interface uses very easy way to identify various icons of the functions of the operation system, all kinds of application programs and files. Users can use the mouse or menus or dialog box to complete the corresponding programs and documents of operation. Graphical user interface elements include the window, icons, menu and dialog boxes, a graphical user interface elements of basic operations include menu operations, window operation and operation of the dialog box.

In a non-standalone mode, there are four implementations are provided on a terminal to allow a user to enable or disable a high frequency function.

Figures 4, 5A:
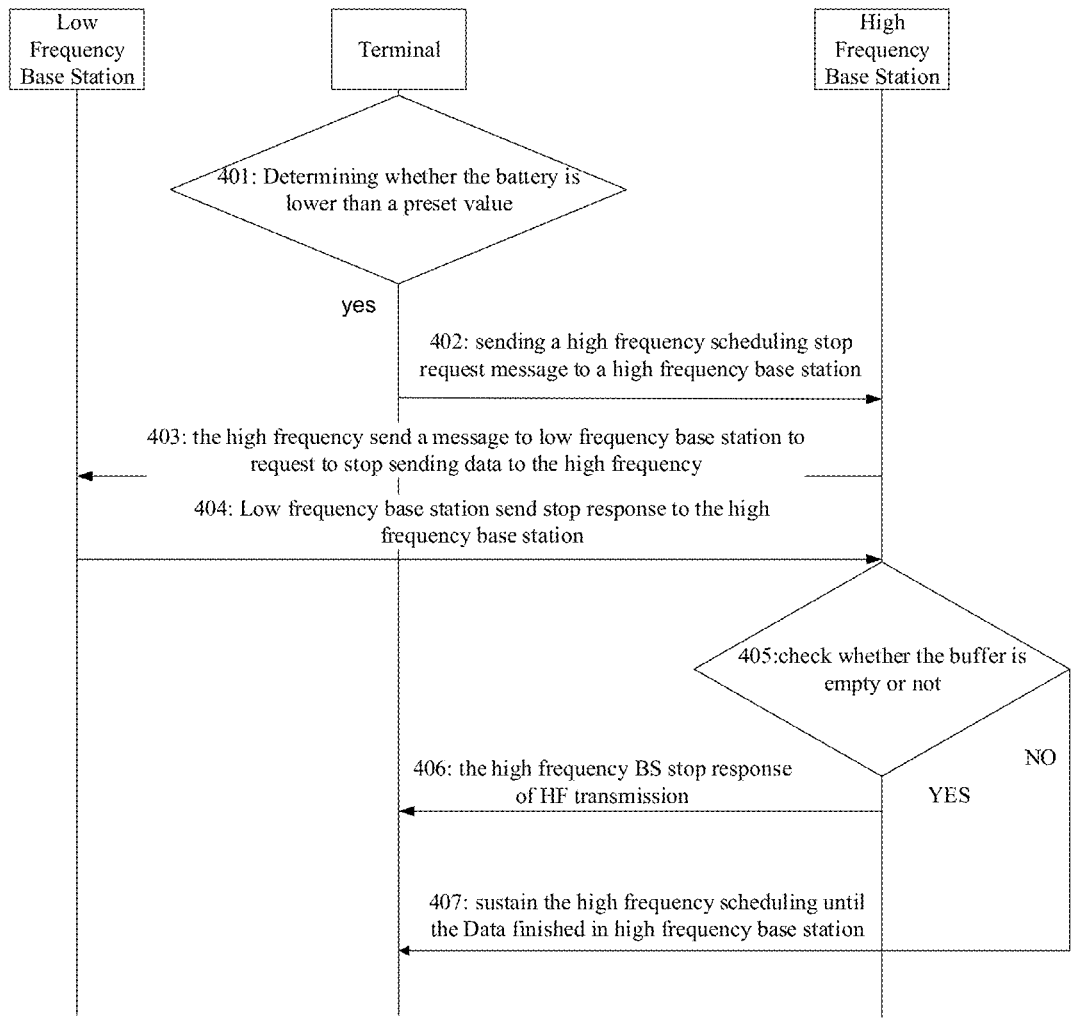
FIG. 5A is a possible implementation manner of reminding message according to the fourth embodiment.

Optionally, in a first possible implementation manner, as shown in FIG. 5A, if a battery level of a terminal is lower than a preset value, for example, 10%, 15% or 20% etc.; or a capability of cache is lower than a preset value; or state of radio channel is too bad, a reminding dialog boxes may display on display screen of the terminal to remind the user of the terminal whether to disable the high frequency connection between the terminal and a high frequency base station.

Optionally, the reminding dialog boxes may only comprises the following message: please shut off the high frequency switch or similar reminding. Then the user will choose whether or not to shut off the high frequency switch through the graphical user interface or by a physical switch. The high frequency switch has four possible implementation manners as shown in following FIG. 6 to FIG. 8.

Optionally, in a second possible implementation manner, as shown in FIG. 5B, the reminding dialog boxes may comprises a "YES" or "NO" button which read: would like to shut off the high frequency switch? YES or NO. If the user clicks the button "YES", the high frequency scheduling is stopped; if the user clicks the button "NO", the high frequency scheduling is continue. It should be noted, if the user clicks the button "YES", the high frequency switches shown in FIG. 6 and FIG. 7 will become gray or some color which is different from enable state and user could not operate them.

The first implementation of high frequency switch is as shown is FIG. 6, in the lower right corner of the following figure, a high frequency switch option is added to the menu. The user may enable or disable the high frequency function through the switch. When the high frequency function is disabled, the terminal does not support high frequency transmission. When the high frequency function is enabled, high frequency transmission could be supported. It should be pointed out that using high frequency to transmit data is faster than using low frequency.

When the icon is gray or some other color which shows disable of some function, the high frequency switch is turned off; when the icon is in another color or turns bright, the high frequency switch is turned on. Any different colors or icons may be used for options.

It should be pointed out that if the terminal is in a standalone high frequency (no low frequency is available for terminal) mode, the high frequency switch cannot be turned off. The high frequency function may be set to be disabled no matter whether a low frequency assisted high frequency mode or the standalone high frequency mode is available.

It should be noted that FIG. 6 is only an example, the high frequency switch could be set on other position of the figure, and also could be set on another setting figure of the terminal, the application is not limited to it.

Figure 7:
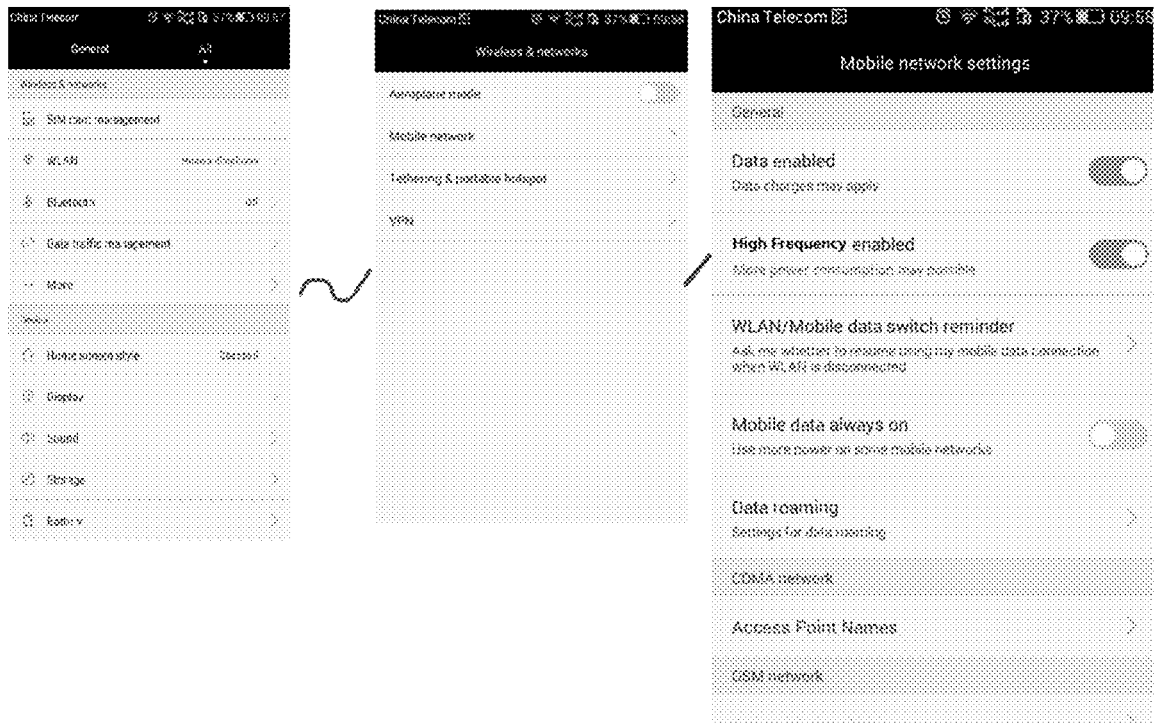
FIG. 7 is a second implementation graph of fourth embodiment according to the present application.

The second implementation of the high frequency switch is as shown is FIG. 7, in terminal settings menu, a high frequency data function is enabled or disabled by clicking or pressing icon "Wireless and Network" in a first menu, then click or press icon "More" in a second menu, then click or press icon "Mobile Network" in a third menu, then click or press icon "High Frequency Data" in a fourth menu. This is only one example of implementation, and the high frequency switch could be set on other position of the terminal configurations, and also could be set on another setting figure of the terminal. The application is not limited to it.

When a network supports only standalone high frequency transmission, the enabling or disabling option does not work, and the high frequency data function is automatically enabled. However, in high frequency data icon, it may be further set to disable the high frequency data function when a battery level is lower than a given value. In this implementation, basic voice communication function is retained.

Figure 8:
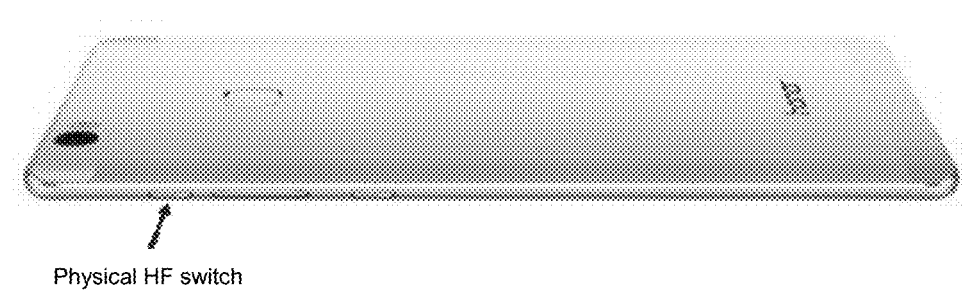
FIG. 8 is a third implementation graph of fourth embodiment according to the present application.

The third implementation of high frequency switch is as shown in FIG. 8, a high frequency switch may be a physical high frequency switch or button, so as to allow a user enable or disable a high frequency function. It should be noted that the FIG. 7 is only an example, the switch or button could be in any shape and in other position of the terminal.

Optionally, when the switch or the button is turned on, a display indicator may be available to indicate that the switch or the button is turned on. The indicator may flash in a certain color.

The fourth implementation is a terminal may further provide a high frequency gesture control function. The gesture control function may be in the following manners:

Continuously pressing for a certain period of time or continuously pressing multiple times by means of a fingerprint;

Performing a specific gesture operation on a screen, for example, drawing a Z or any other gesture.

Gesture control has certain limitations, and a user of the terminal may be unable to perform an operation. When a gesture is used for operations, a setting function is further needed for setting.

The present application brings the following beneficial effects:

The advantage of the second embodiment is considering many unexpected conditions may happen in high frequency transmission, it adopts the future 5G much better. For example, when considering the battery level, the embodiment 1 reduces power consumption. When considering the status of channel, the embodiment 1 could provide a better user experience. When considering the capability of cache, the embodiment 2 could stop the possible error.

Figure 9:
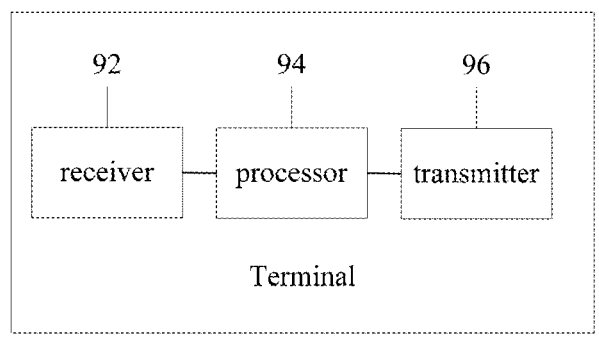
FIG. 9 is a schematic structure of a terminal according to one embodiment of the present application.

FIG. 9 is a schematic structural diagram of a terminal according to an embodiment of the present application. As shown in FIG. 9, the terminal includes a receiver 92, a processor 94 and a transmitter 96, the transmitter 96 and the receiver 92 are coupled to the processor 94.

The receiver 92 is configured to receive a connection request message from a low frequency base station, and the connection request message includes a request for connecting the terminal with a high frequency, HF, base station.

The processor 94 is configured to generate a response message based on the request and at least one parameter of the terminal.

the transmitter 96 is configured to transmit the generated response message to the LF base station, wherein the response message is used to determine whether to establish a connection with the HF base station.

Optionally, when the response message indicates a rejection of connecting with the HF base station, the response message includes a cause of rejection.

Optionally, the at least one parameter of the terminal is: battery level, capability of buffer, channel status.

Optionally, the high frequency scheduling message is a RRC message or a MAC CE.

Optionally, the connection request message includes at least one of the following: maximum bandwidth scheduled for the terminal, or a scheduled data volume, or pre-estimated scheduling duration.

Optionally, the response message includes at least one of the following: Maximum transmit power, or maximum bandwidth could be scheduled, or estimated scheduling duration could be supported, or a battery level.

The description about embodiment 1 is also adapted to this embodiment.

FIG. 10 is a schematic structural diagram of a terminal according to another embodiment of the present application. As shown in FIG. 10, the terminal includes a processor 12, display 14 and user interface 16, the user interface 16 may be a physical interface or a software run based on the processor 12 and shown on the display 14.

The processor 12 is configured to send a message to display module when detecting a battery level is lower than a preset value.

The display 14 is configured to display information reminder a user of the terminal to disable a switch of high frequency function.

User interface 16 is configured to include a switch of high frequency function, turning on the switch indicating the terminal could transmit data with a high frequency base station and when turn off the switch indicating the terminal could not transmit data with the high frequency base station.

Optionally, the switch of high frequency function is a physical button, set on one side of the terminal. As shown in FIG. 7.

Optionally, the switch of high frequency is turned on or off by pressing for a certain period of time by means of a fingerprint.

Optionally, the switch of high frequency is turned on or off by performing a gesture operation on the display. As shown in FIG. 8.

Optionally, the switch of high frequency is set on graphical user interface, GUI, of the terminal, when turn off the switch, the color of the switch is turned to gray.

Figure 11:
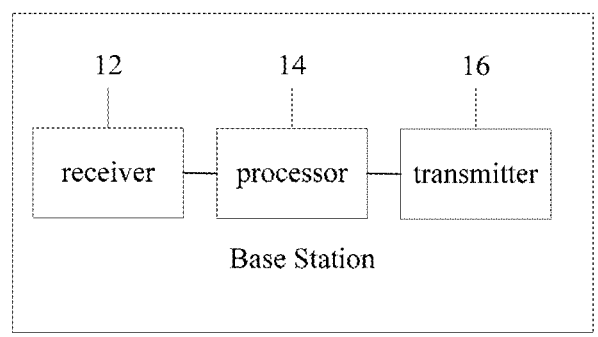
FIG. 11 is a schematic structural diagram of a low frequency base station according to an embodiment of the present application.

FIG. 11 is a schematic structural diagram of a low frequency base station according to an embodiment of the present application. As shown in FIG. 11, the base station includes a receiver 12, a processor 14 and a transmitter 16, the transmitter 16 and the receiver 12 are coupled to the processor 14.

Receiver 12 is configured to receive a termination request message includes an identifier of a terminal, the termination request message including a request for terminating a high frequency connection between the terminal and a high frequency, HF, base station.

Processor 14 is configured to generate a response message based on the received termination request message and a parameter of the high frequency connection.

Transmitter 16 is configured to send the response message to the HF base station.

Optionally, the parameter of the HF connection includes at least one of following:

the amount of data transmitted, the amount of data to be transmitted.

The description about embodiment 1 is also could adapted to this embodiment.

A person skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

Steps of methods or algorithms described in the embodiments disclosed in this specification may be implemented by hardware, a software module executed by a processor, or a combination thereof. The software module may reside in a random access memory (RAM), a memory, a read-only memory (ROM), an electrically programmable ROM, an electrically erasable programmable ROM, a register, a hard disk, a removable disk, a CD-ROM, or any other form of storage medium known in the art.

In the foregoing specific implementation manners, the objective, technical solutions, and benefits of the present invention are further described in detail. It should be understood that the foregoing descriptions are merely specific implementation manners of the present invention, but are not intended to limit the protection scope of the present invention. Any modification, equivalent replacement, or improvement made without departing from the principle of the present invention should fall within the protection scope of the present invention.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

The invention claimed is:

1. A method for managing a high frequency connection in a high frequency network, comprising:
   receiving, by a terminal, a connection request message from a low frequency (LF) base station, wherein the connection request message includes a connection request for the terminal to establish a connection with a high frequency (HF) base station;
   determining, by the terminal, whether to connect to the HF base station based on at least one parameter of the terminal, the at least one parameter of the terminal including capability of a cache of the terminal;
   generating, by the terminal, a response message based on the request and the determination by the terminal, wherein the response message indicates whether the terminal accepts or rejects the connection request from the LF base station; and
   transmitting, by the terminal, the generated response message to the LF base station, wherein the response message contains information for the LF base station to determine whether the terminal accepted the request to connect to facilitate establishing a connection between the terminal and the HF base station.

2. The method according to claim 1, wherein when the response message indicates the terminal rejects the connection request with the high frequency base station, the response message includes a cause of rejection.

3. The method according to claim 1, wherein the at least one parameter of the terminal is: a battery level, a capability of a buffer, or a channel status.

4. The method according to claim 1, wherein the connection request message includes at least one of the following:
   a maximum bandwidth scheduled for the terminal, a scheduled data volume, a pre-estimated scheduling duration, or an identifier of high frequency base station.

5. The method according to claim 1, wherein the response message includes at least one of the following:
   maximum transmit power, available bandwidth, estimated scheduling duration, or a battery level.

6. The method according to claim 1, further comprising accessing the HF base station, by the terminal, following transmitting the generated response indicating acceptance of the connection request.

7. The method according to claim 6, wherein the accessing the HF base station by the terminal occurs prior to the terminal receiving a communication from the HF base station.

8. A terminal, comprising a transmitter, a receiver and a processor coupled to the transmitter and the receiver, wherein,
   the receiver is configured to receive a connection request message from a low frequency (LF) base station, wherein the connection request message includes a connection request for the terminal to establish a connection with a high frequency (HF) base station;
   the processor is configured to:
      determine whether to connect to the HF base station based on at least one parameter of the terminal, the at least one parameter of the terminal including capability of a cache of the terminal, and
      generate a response message based on the request and the determination whether to connect to the HF base station, wherein the response message indicates whether the terminal accepts or rejects the connection request from the LF base station; and
   the transmitter is configured to transmit the generated response message to the LF base station, wherein the response message contains information for the LF base station to determine whether the terminal accepted the request to connect to facilitate establishing a connection between the terminal and the HF base station.

9. The terminal according to claim 8, wherein when the response message indicates the terminal rejects the connection request with the HF base station, the response message includes a cause of rejection.

10. The terminal according to claim 8, wherein the at least one parameter of the terminal is: a battery level, a capability of a buffer, or a channel status.

11. The terminal according to claim 8, wherein the connection request message includes at least one of the following:
    maximum bandwidth scheduled for the terminal, a scheduled data volume, pre-estimated scheduling duration, or an identifier of high frequency base station.

12. The terminal according to claim 8, wherein the response message includes at least one of following:
    a maximum transmit power, an available bandwidth, an estimated scheduling duration, or a battery level.

13. The terminal according to claim 8, wherein the transmitter is further configured to access the HF base station following transmitting the generated response indicating acceptance of the connection request.

14. The terminal according to claim 13, wherein the transmitter is configured to access the HF base station prior to the receiver receiving a communication from the HF base station.

15. A method for managing a high frequency connection, comprising:

receiving, by a low frequency (LF) base station, a termination request message from a terminal, wherein the terminal request message includes an identifier of the terminal and a request for terminating a high frequency connection between the terminal and a high frequency (HF) base station;

generating, by the LF base station, a response message based on the received termination request message and a parameter of the high frequency connection; and sending, by the LF base station, the response message to the HF base station, the response message includes a cause for termination.

16. The method according to claim 15, wherein the parameter of the HF connection includes at least one of following:

the amount of data transmitted or the amount of data to be transmitted.

17. The method according to claim 15, the termination request message further comprises the cause for termination.

18. The method according to claim 17, wherein the cause for termination includes at least one of battery level of the terminal being below a preset value, capability of a cache of the terminal being lower than a predetermined value or poor state of a channel between the terminal and the HF base station.

19. The method according to claim 15, wherein sending the response message includes instructing the HF base station to disconnect from the terminal.

20. The method according to claim 15, wherein sending the response message includes instructing the HF base station to maintain connection with the terminal.

* * * * *